United States Patent

[11] 3,614,350

[72] Inventors Charles D. Eichelberger
Ridley Park;
Lawrence J. Kosich, Glenolden, both of Pa.
[21] Appl. No. 56,333
[22] Filed July 20, 1970
[45] Patented Oct. 19, 1971
[73] Assignee General Electric Company

[54] SHUTTER ARRANGEMENT FOR A SWITCHGEAR UNIT
5 Claims, 4 Drawing Figs.
[52] U.S. Cl. ............................................. 200/50 AA, 317/103
[51] Int. Cl. ............................................. H02b 11/22
[50] Field of Search ................................ 200/50 AA; 317/103

[56] References Cited
UNITED STATES PATENTS
2,340,082 1/1944 Sauers ..................... 317/103
3,015,756 1/1962 Kreekon et al. .......... 200/50 AA X
3,121,144 2/1964 Tjebben .................... 200/50 AA
3,277,252 10/1966 Beddoe ..................... 200/50 AA
FOREIGN PATENTS
213,899 3/1958 Australia ................... 200/50.15

Primary Examiner—David Smith, Jr.
Assistant Examiner—M. Ginsburg
Attorneys—J. Wesley Haubner, William Freedman, Frank L. Neuhauser, Oscar B. Waddell and Joseph B. Forman ABSTRACT: A switchgear unit comprises a cubicle having two groups of stationary disconnect contacts and two shutters for controlling access to the stationary contacts. The shutters are pivotally mounted on the cubicle for motion about vertically spaced horizontal axes between blocking and nonblocking positions with respect to the contacts. A linkage interconnecting the two shutters causes pivotal motion thereof to occur in unison and in opposite angular directions with respect to each other. The weight of one pivotally mounted shutter counterbalances the weight of the other during their oppositely directed movement between blocking and nonblocking positions, thus reducing the force needed to operate the pivotally mounted shutters.

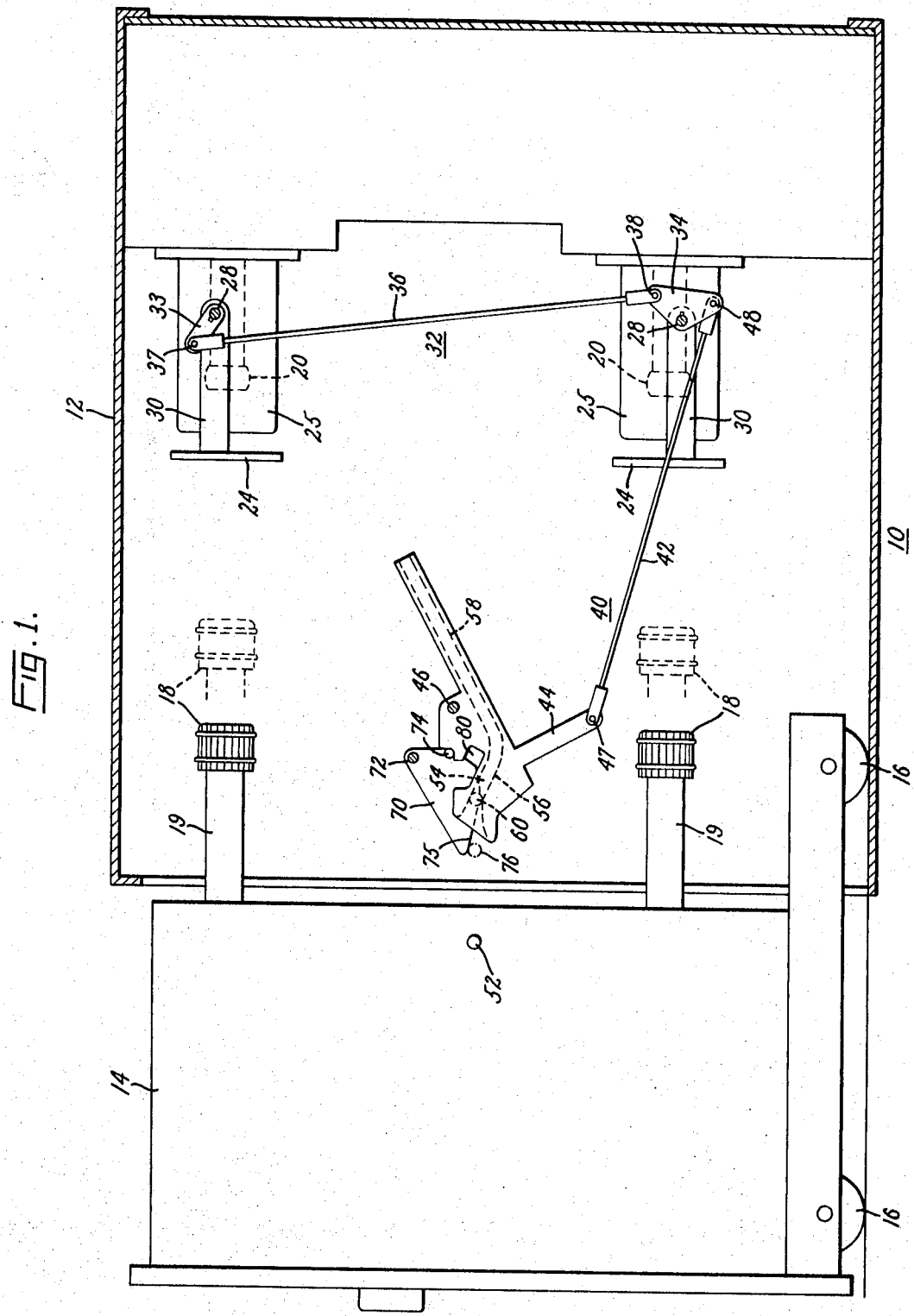

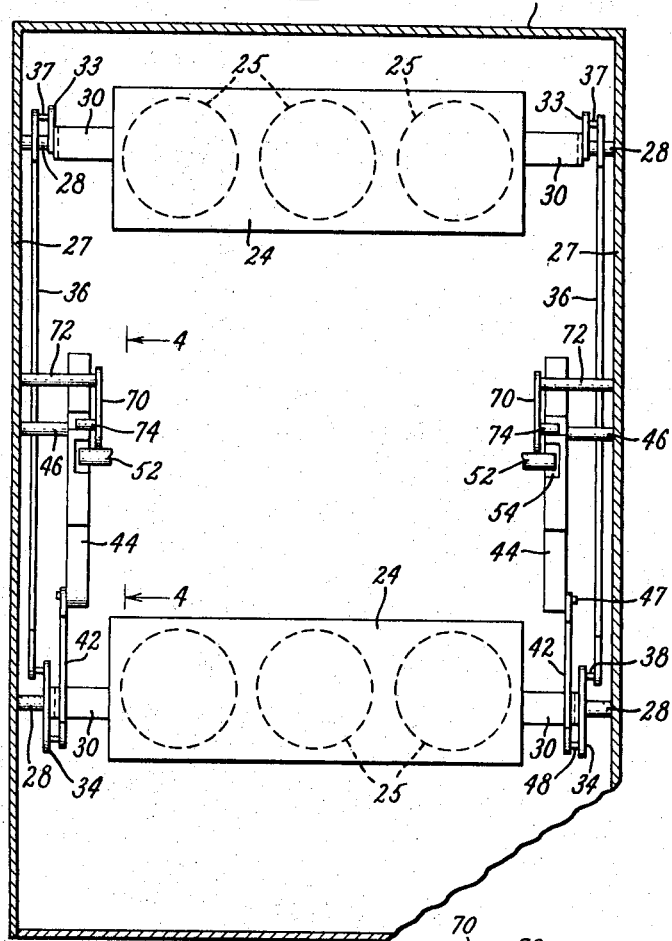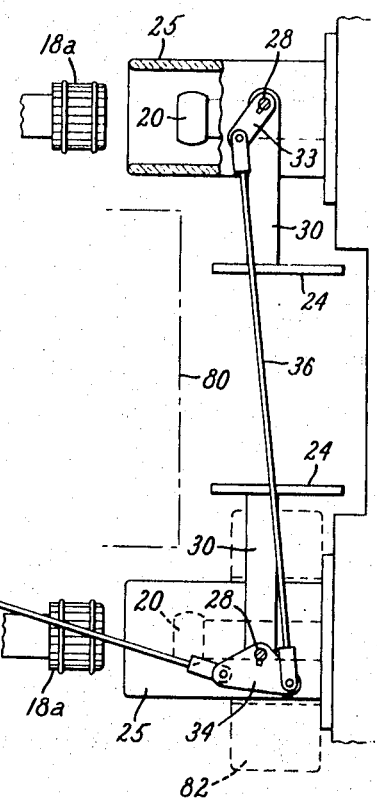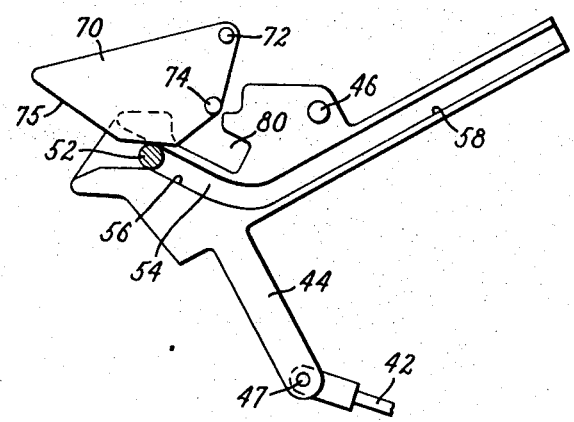
INVENTORS:
CHARLES D. EICHELBERGER,
LAWRENCE J. KOSICH,
BY William Freedman
ATTORNEY

SHUTTER ARRANGEMENT FOR A SWITCHGEAR UNIT

This invention relates to a switchgear unit comprising a cubicle and a circuit breaker movably mounted therein and relates, more particularly, to a shutter arrangement which protects the live stationary disconnect contacts of such a unit from being accidentally engaged when the circuit breaker has been removed from the cubicle.

In our shutter arrangement, there are two shutters, each pivotally mounted about a horizontal axis and each having a blocking position in front of a group of stationary disconnect contacts where it acts as a barrier for blocking accidental engagement with these stationary disconnect contacts. These shutters can be moved from this blocking position into a nonblocking position to permit the stationary contacts to be engaged by cooperating contacts on the movable circuit breaker unit. For moving the shutters between the blocking and nonblocking positions, there is a shutter-operating mechanism which is arranged to be operated in response to circuit breaker movement by a member coupled to the movable circuit breaker.

In certain switchgear units, e.g., high-voltage units rated 34.5 kv., these shutters can be very massive. A problem involved in pivoting such massive shutters about their horizontal support axes between blocking and nonblocking positions is that unduly high operating forces can be required. This problem can become especially severe if such shutter motion must be completed in response to a very short travel of the circuit breaker. In such cases, the racking mechanism, which supplies the force for moving the circuit breaker and for operating the shutters, can be excessively loaded.

An object of our invention is to provide means for interconnecting the shutters for movement in unison which is effective to limit to a low value the force required to operate the shutters, despite the fact that the shutters might be very massive and despite the fact that the shutters must be moved through a large distance in response to a relatively short travel of the movable circuit breaker.

In carrying out our invention in one form, we provide two shutters, each mounted for pivotal motion about a horizontal axis between blocking and nonblocking positions with respect to the stationary disconnect contacts. Linkage means interconnects the shutters for pivotal motion in unison and causes pivotal motion of one shutter to be in an opposite angular direction with respect to the pivotal motion of the other shutter. The weight of one pivotally mounted shutter acting through said linkage means counterbalances the weight of the other shutter during said oppositely directed movement of the shutters, thereby reducing the force required for operating the pivotally mounted shutters in unison.

For a better understanding of the invention reference may be had to the following description taken in conjunction with the accompanying drawings, wherein:

FIG. 1 is a side elevational view partly in section of a switchgear unit embodying one form of the invention. The shutters are shown in their blocking position.

FIG. 2 is a front end view of the switchgear unit of FIG. 1 with the movable circuit breaker removed.

FIG. 3 is a side elevational view, partly in section, of a portion of the switchgear unit of FIG. 1 except showing the shutters in their nonblocking position.

FIG. 4 is a sectional view along the line 4—4 of FIG. 2.

Referring now to FIG. 1, there is shown a switchgear unit 10 comprising a metal cubicle 12 and a removable, or drawnout, circuit breaker unit 14 mounted on suitable wheels 16. The wheels allow the circuit breaker unit to be rolled horizontally from the withdrawn position shown to a fully inserted position inside the cubicle. In the fully inserted position, a set of socket-type contacts 18 carried by the movable circuit breaker unit on forwardly projecting conductive studs 19 fully engage a set of plug-type stationary contacts 20 suitably supported on the cubicle. Mating pairs of contacts 18 and 20 when fully engaged form the terminals for a power circuit (not shown) extending through the circuit breaker unit and controlled thereby. In the embodiment illustrated in FIG. 1, the lower stationary disconnect contacts are connected to a load, and the upper stationary disconnect contacts are connected to a live bus and are normally energized.

The circuit breaker can be placed in operation by pushing the movable breaker unit 14 into the cubicle a predetermined distance and by then moving it to the right to its fully connected position by means of a suitable racking mechanism (not shown). This racking mechanism may be of any suitable conventional form, e.g., the form shown and claimed in U.S. Pat. No. 3,440,371, Netzel et al., assigned to the assignee of the present invention.

When the circuit breaker is in a withdrawn position such as shown in FIG. 1, it is necessary that suitable shutters cover the stationary disconnect contacts 20 to prevent anyone working inside the cubicle from accidentally engaging them. In FIG. 1, such shutters are shown at 24 located in a blocking position in front of the stationary contacts 20. These shutters 24 can be either of insulating material or metal at ground potential. Tubes 25 of insulating material surround the stationary contacts in radially spaced relationship and further shield them from accidental engagement.

Each of the shutters 24 is movably mounted so that under certain conditions it can be displaced from its blocking position shown in FIG. 1. For movably mounting each shutter 24, a pair of aligned horizontally extending pins 28 are suitably fixed to the vertical walls 27 of the cubicle 12, as shown in FIG. 2. Each shutter 24 comprises a pair of horizontally spaced-apart legs 30 at its opposite ends which are pivotally mounted on the pins 28. Thus, each shutter is mounted for pivotal motion about a horizontal axis formed by pivot pins 28.

The two shutters 24 mechanically interconnected by two substantially identical linkages 32, one at each side on the cubicle 12. Each linkage 32 comprises a crank arm 33 fixed to one leg 30 of the upper shutter and pivotable about the axis of pivot 28, a crank arm 34 fixed to one leg 30 of the lower shutter and pivotable about the axis of lower pivot 28, and a connecting link 36 pivotally connected by pins 37 and 38 at its respective opposite ends to crank arms 33 and 34. Referring to FIG. 1, it is to be noted that the upper pivotal connection 37 and the lower pivotal connection 38 are located on horizontally opposite sides of a vertical plane passing through pivots 28. Accordingly, when the lower shutter 24 is pivoted in one angular direction about its pivot 28, the upper shutter is pivoted in the opposite angular direction. For example, when the lower shutter is pivoted clockwise from its position of FIG. 1 to its position of FIG. 3, the upper shutter is pivoted counterclockwise from its position of FIG. 1 to its position of FIG. 3. When the shutters have moved into their nonblocking position shown in FIG. 3, they are disposed in a location between the upper and lower stationary disconnect contacts 20.

For operating the shutters 24 we provide two shutter operating mechanisms 40, one disposed at one side of the cubicle 12 and the other at the other side, as shown in FIGS. 1 and 2. Since these shutter operating mechanisms 40 are substantially identical and normally operate in unison, only one will be described in detail. Referring to FIG. 1, shutter operating mechanism 40 comprises a link 42 and a cam plate 44. Cam plate 44 is pivotally mounted on a stationary pivot 46 fixed to a vertical wall of cubicle 12. At one of its ends, link 42 is pivotally connected by a pin 47 to cam plate 44, and at its opposite end link 42 is pivotally connected by a pin 48 to a downwardly projecting extension of crank 34.

The cam plate 44 is arranged to be operated in response to motion of the movable circuit breaker unit 14 within cubicle 12. In this respect, note that the cam plate contains an open ended cam slot 54 that is adapted to receive a pin or roller 52 effectively fixed to one side of the movable circuit breaker unit. When the movable circuit breaker unit 14 is completely withdrawn from cubicle 12, the cam plate 44 occupies the position of FIG. 1 and the shutter is accordingly fully closed as shown. When the circuit breaker unit is moved to right from its position of FIG. 1 toward its fully inserted position, pin 52 enters cam slot 54. The first part of the cam slot 54 is a dwell portion, and, as a result, the pin 52 can be moved into the dotted line positions 60 of FIG. 1 (i.e., the position of FIG. 4) without causing any motion of the cam plate 44. The position occupied by the circuit breaker when the pin 52 is in its dotted line position of FIG. 1 is known as the test position of the circuit breaker.

When the circuit breaker is moved further to the right from its test position, the pin 52 engages an active portion 56 of cam slot 54, thereby pivoting the cam plate 44 clockwise about its pivot 46. This clockwise motion of the cam plate 44 is transmitted through link 42 and crank arm 34 to the shutters 24, thereby pivoting the shutters from their blocking position of FIG. 1 into their fully open or nonblocking position of FIG. 3.

When the pin 52 has reached a point near the right hand end of the active portion 56 of cam slot 54, the movable disconnect contacts have reached a position near their position 18a of FIG. 3 where they are spaced only a short distance from the stationary disconnect contacts 20. The shutters 24, being near their fully open positions, are no longer between the movable and stationary disconnect contacts 18 and 20. Thus, further movement to the right of the movable circuit breaker unit 14 drives the movable disconnect contacts 18 into engagement with the stationary disconnect contacts 20 without interference from shutters 24. During such movement of the movable circuit breaker, pin 52 first moves to the end of active portion 56 of the cam slot, thereby completing opening movement of the shutter. Pin 52 then moves along another dwell portion 58 of the cam slot and such motion of the pin produces no additional motion of the shutters 24.

When the circuit breaker is withdrawn from its fully connected position, the above-described sequence of events is repeated in reverse order. That is, initial withdrawal of the circuit breaker produces no shutter motion. Further withdrawal of the circuit breaker causes pin 52 acting in the active portion 56 of cam slot 54 to drive the cam plate 44 counterclockwise, thereby returning the shutter to its solid line closed position of FIG. 1. The circuit breaker can then be completely withdrawn from the cubicle without further affecting the shutter position.

For assuring that the shutter is not accidentally operated out of its blocking position, when the circuit breaker has been withdrawn beyond its test position or completely out of the cubicle, a latch 70 cooperating with the cam plate 44 is provided. This latch 70 is pivotally mounted on a stationary pivot 72 and is gravity biased in a counterclockwise direction into its latching position of FIG. 1. A latching pin 74 on the latch 70 engages the upper surface of cam plate 44, thereby blocking any motion of the cam plate out of its position of FIG. 1 so long as the latch remains in its position of FIG. 1. When the movable circuit breaker unit 14 has been inserted a predetermined distance into cubicle 12, the pin 52 thereon, reaching the dot-dash position 76 of FIG. 1, will engage a cam surface 75 on the latch 70. Further insertion of the movable circuit breaker unit 14 will cause pin 52 acting on cam surface 75 to pivot latch 70 in a clockwise direction toward a released position. After latch 70 is moved clockwise in this manner for a short distance, the latching pin 74 enters a position (depicted in FIG. 4) where it aligns with a notch 80 in the cam plate 44. Cam plate 44 is then free to pivot in a clockwise direction about its pivot 46, which it does in response to further insertion of the movable circuit breaker unit 14 when pin 52 is operating on the active part 56 of cam slot 54, as was explained hereinabove. The notch 80 is of such a shape that cam plate 44 is free to pivot as previously described without interference from latching pin 74 so long as the latching pin is in the notch 80. It may be noted at this point that when pin 52 passes beyond latch 70, latch 70 pivots in a counterclockwise direction under the influence of gravity into its position of FIG. 4.

Latch 70 is restored to its latching position of FIG. 1 by the camming action of pin 52 on the lower surface of latch 70 during circuit breaker withdrawal. Such withdrawal causes pin 52 to pivot latch 70 in a clockwise direction from its position of FIG. 3 past its position of FIG. 1, after which latch 70 returns in a counterclockwise direction to its position of FIG. 1 as the pin 52 moves through the final portion of cam slot 54.

Our shutter arrangement is especially adapted for use in high-voltage metal clad equipment, e.g., 34.5 kv. equipment, where the shutters are quite massive. A problem that can be involved in pivoting such massive shutters about horizontal axes is that unduly high operating forces can be required. We are able to greatly reduce the required operating forces because we counterbalance the weight of one shutter with the weight of the other shutter. In this respect, as above explained, the connecting linkage 32 between the two shutters causes motion of the shutters to take place in opposite angular directions. Accordingly, the weight of the upper shutter, acting through the connecting linkage 32 during counterclockwise movement of the upper shutter from the blocking to the nonblocking position, biases the lower shutter to move in a clockwise direction, thereby assisting in lifting the lower shutter into its nonblocking position during circuit breaker insertion. Similarly, during circuit breaker withdrawal, when the lower shutter is returned in a counterclockwise direction to its blocking position, its weight biases the upper shutter in a clockwise direction to assist in lifting the upper shutter into its blocking position.

As pointed out hereinabove, the shutters are operated by the pin 52 working in the cam slot 54. In order to reduce the depth of the cubicle 12 as much as possible, it is desirable that the shutters be operated in response to a very short travel of the movable circuit breaker unit 14. This relationship is attained by making the active portion 56 of the cam slot 54 quite short and steep. Employing a short, steep cam typically necessitates very high shutter-operating forces, but because of our above-described counterbalancing effect, we are able to limit these operating forces to very low values despite reliance upon a short, steep cam and despite the massiveness of the shutters. Thus, reduced forces are imposed upon the racking mechanism (not shown) that is used for supplying the forces for inserting and withdrawing the circuit breaker.

Using shutters that are pivoted about horizontal axes, instead of the commonly used sliding shutter, has a number of advantages. First of all, such pivoted shutters readily lend themselves to being counterbalanced by reliance upon a simple interconnecting linkage, such as my above-described linkage 32. Secondly, the pivoted shutters can be moved into a nonblocking position well behind the front faces of insulating tubes 25, thus providing more room for the movable circuit breaker unit in the cubicle. In this respect, in one embodiment of the invention, the circuit breaker has a portion indicated by the dot-dash lines 80 of FIG. 3 which projects into the space between insulating tubes 25 when the circuit breaker is fully inserted without interference from the shutters. Additionally, with the pivoted shutters, it is a simple matter to remove a current transformer (such as indicated at 82 in FIG. 3) that may be mounted around one of the insulating tubes 25. When the shutters are in their nonblocking position of FIG. 3, such a current transformer can easily be removed from the front of the switchgear unit with no need for first disassembling the shutter arrangement. The current transformer is simply unbolted and slid off the tube 23 toward the front of the cubicle. It is to be understood that where current transformers are mounted about tubes 25, the tubes are spaced sufficiently far apart to provide space for the transformers. It is to be noted that the shutters, in their nonblocking positions of FIG. 3, are located in a region between the vertically spaced groups of stationary disconnect contacts 20. This relationship is most desirable since it obviates the need for making the cubicle taller to accommodate the shutters, which would be necessary if the nonblocking positions of the shutters were on the opposite vertical sides of the disconnect contacts 20.

While we have shown and described a particular embodiment of the invention, it will be obvious to those skilled in the art that various changes and modifications may be made

What we claim as new and desire to secure by Letters Patent of the United States is:

1. In a switchgear unit comprising a cubicle having a first group of stationary disconnect contacts mounted thereon at one level and a second group of stationary disconnect contacts mounted thereon at another level, a circuit breaker movable into and out of said cubicle and having first and second groups of movable disconnect contacts mounted thereon for engaging said stationary contacts when said circuit breaker is moved completely into said cubicle and for disengaging said stationary contacts when said circuit breaker is moved out of said cubicle, the combination of:

a. a first shutter pivotally mounted on said cubicle for pivotal motion about a substantially horizontal axis between a blocking position covering said first group of stationary disconnect contacts and a nonblocking position allowing said first group of stationary disconnect contacts to be engaged by said first group of movable disconnect contacts when said circuit breaker is fully inserted into said cubicle,
   b. a second shutter pivotally mounted on said cubicle for pivotal motion about a substantially horizontal axis between a blocking position covering said second group of stationary disconnect contacts and a nonblocking position allowing said second group of stationary disconnect contacts to be engaged by said second group of movable disconnect contacts when said circuit breaker is fully inserted into cubicle,
   c. the pivot axis of said first shutter being vertically spaced from the pivot axis of said second shutter,
   d. linkage means interconnecting said two shutters for causing pivotal motion of said two shutters between said blocking and nonblocking positions to occur substantially in unison and for causing the pivotal motion of one shutter to be in an opposite direction from the pivotal motion of the other shutter during travel of said shutters between blocking and nonblocking positions,
   e. the weight of one shutter acting through said linkage means to counterbalance the weight of the other shutter during said oppositely directed movement of the shutters between their blocking and nonblocking positions,
   f. a shutter-operating mechanism coupled to one of said shutters and operable to pivot said one shutter from its nonblocking into its blocking position when said circuit breaker is withdrawn from a contact-engaged to a contact-disengaged position and for returning said one shutter to its nonblocking position when said circuit breaker is returned to its contact-engaged position, and
   g. said shutter-operating mechanism comprising means responsive to motion within said cubicle of a part coupled to said movable circuit breaker for supplying shutter-operating forces to said shutter-operating mechanism.

2. The structure of claim 1 in which:
   a. said shutter operating mechanism comprises a cam plate pivotally mounted on said cubicle and means coupling said cam plate to one of said shutters for pivoting said one shutter in response to pivotal motion of said cam plate,
   b. said cam plate has a cam slot therein,
   c. said part coupled to said movable circuit breaker is a cam operating member that moves in said cam slot to cause pivotal motion of said cam plate,
   d. a latch is provided for holding said cam plate in a position wherein said shutters are held in their blocking position when said movable circuit breaker is withdrawn from said cubicle,
   e. said latch has a cam surface thereon engageable by said cam operating member to move said latch into a nonholding position with respect to said cam plate in response to partial insertion of said circuit breaker into said cubicle.

3. The structure of claim 2 in which said cam plate has a notch therein and said latch includes a pin for engaging said cam plate to hold said cam plate in said position where the shutters are in their blocking positions, said pin aligning with said notch when said latch is moved into said nonlatching position, thereafter permitting pivotal motion of said cam plate free of restraint from said pin.

4. The structure of claim 1 in which:
   a. said first group of contacts is vertically spaced from said second group, and
   b. the nonblocking positions of said shutters are located in a region between said two groups of contacts.

5. The structure of claim 1 in which said linkage means comprises:
   a. a crank arm fixed to each shutter for pivotal motion about the axis of support of the shutter, and
   b. a connecting link between said crank arms pivotally connected at its opposite ends to said crank arms, the point of connection between said link and one crank arm being at one horizontal side of a generally vertical plane passing through said pivot axes and the point of connection between said link and said other crank arm being at the opposite horizontal side of said plane.